(12) United States Patent
Kleine-Besten et al.

(10) Patent No.: US 8,849,488 B2
(45) Date of Patent: Sep. 30, 2014

(54) METHOD AND CONTROL UNIT FOR CONTROLLING A HYBRID DRIVE OF A VEHICLE

(75) Inventors: Thomas Kleine-Besten, Braunschweig (DE); Jobst Gercke, Nordstemmen (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 13/505,932

(22) PCT Filed: Oct. 22, 2010

(86) PCT No.: PCT/EP2010/065935
§ 371 (c)(1),
(2), (4) Date: Jul. 12, 2012

(87) PCT Pub. No.: WO2011/067033
PCT Pub. Date: Jun. 9, 2011

(65) Prior Publication Data
US 2012/0271497 A1    Oct. 25, 2012

(30) Foreign Application Priority Data
Dec. 2, 2009   (DE) .......................... 10 2009 047 395

(51) Int. Cl.
| | |
|---|---|
| B60L 11/00 | (2006.01) |
| G05D 1/00 | (2006.01) |
| G01C 21/00 | (2006.01) |
| B60W 30/182 | (2012.01) |
| B60W 10/08 | (2006.01) |
| G01C 21/34 | (2006.01) |
| B60W 10/06 | (2006.01) |
| B60W 20/00 | (2006.01) |

(52) U.S. Cl.
CPC ......... *G01C 21/3469* (2013.01); *Y02T 10/6291* (2013.01); *B60W 30/182* (2013.01); *B60W 10/08* (2013.01); *B60W 20/00* (2013.01); *B60W 10/06* (2013.01)
USPC ........................ 701/22; 701/400; 180/65.28

(58) Field of Classification Search
USPC .............. 701/22, 25, 400, 425, 461; 340/988; 180/65.28
See application file for complete search history.

(56) References Cited

U.S. PATENT DOCUMENTS 4,926,336 A * 5/1990 Yamada ........................ 701/533
5,441,122 A * 8/1995 Yoshida ................... 180/65.245
(Continued)

FOREIGN PATENT DOCUMENTS

| | | |
|---|---|---|
| DE | 19807291 | 8/1999 |
| DE | 102005047333 | 2/2006 |
| EP | 1256476 | 11/2002 |
| EP | 1297982 | 4/2003 |
| EP | 1842758 | 10/2007 |
| WO | WO 2008148606 | 12/2008 |
| WO | WO 2009006983 | 1/2009 |

OTHER PUBLICATIONS

International Search Report, PCT International Application No. PCT/EP2010/065935, dated Dec. 20, 2010.

*Primary Examiner* — Yonel Beaulieu
(74) *Attorney, Agent, or Firm* — Kenyon & Kenyon LLP

(57) ABSTRACT

A method for controlling a hybrid drive of a vehicle, the hybrid drive having an electric drive and a fuel drive. A database which has assignments between route information and first and second route criteria is provided. The route information represents routes which may be traveled by the vehicle. The first route criterion represents a preferred use of the electric drive on the particular assigned route, and the second route criterion represents a preferred use of the fuel drive on the particular assigned route. Current route information which represents a route traveled by the vehicle is received, and a current route criterion assigned to the current route information is provided from the database, and control information is also provided for using the electric drive if the current route criterion is the first route criterion or for using the fuel drive if the current route criterion is the second route criterion.

11 Claims, 2 Drawing Sheets

(56) References Cited

U.S. PATENT DOCUMENTS 5,664,635 A * 9/1997 Koga et al. ............... 180/65.245
5,815,824 A 9/1998 Saga et al.
6,314,347 B1 11/2001 Kuroda et al.
2010/0274422 A1 10/2010 Schrey et al.

* cited by examiner

METHOD AND CONTROL UNIT FOR CONTROLLING A HYBRID DRIVE OF A VEHICLE

FIELD OF THE INVENTION

The present invention relates to a method for controlling a hybrid drive of a vehicle, to a method for calculating a route with the aid of a navigation system, to a corresponding control unit as well as to a corresponding computer program product as well as to a database for a navigation system and a system for controlling hybrid drives in a plurality of vehicles.

BACKGROUND INFORMATION

The use of hybrid drives in vehicles is becoming increasingly more important, since these vehicles are able to reduce fuel consumption. European Patent No. EP 1 256 476 A2 describes a method which performs complex control of the hybrid drive (energy recovery, etc.) and, in doing so, accesses route guidance information with the aid of the navigation system. European Patent No. EP 1 842 758 A1 describes a method which specifies a route guidance to thereby recover the greatest possible amount of energy for the hybrid drive.

SUMMARY

Against this background, the present invention provides an example method for controlling a hybrid drive of a vehicle, an example method for calculating a route with the aid of a navigation system, furthermore a control unit which uses these methods as well as a corresponding computer program product, a database for a navigation system and finally an example system for controlling hybrid drives in a plurality of vehicles.

An object of the present invention is to introduce a simple (route) criterion for using a hybrid drive of a vehicle. The route criterion may be used to specify when the electric drive and when the fuel drive of the hybrid drive are to be used. This criterion is directed at when the electric drive and when the fuel drive may be used more efficiently. According to the present invention, simple control of the hybrid drive may be achieved. An object is to reduce complexity. For this purpose, the new route criterion is used which evaluates the efficiency of the use of a type of hybrid drive. This criterion may be made dynamic and managed via a server.

The route criterion may be designed dynamically. An adaptation to the traffic situation may thus be carried out. The data for the route criterion may be detected by the motor vehicles which travel the particular route. The motor vehicles may transmit the detected data to a server, which, in turn, distributes the data to other vehicles.

According to the present invention, the total distance of a route to be traveled may furthermore be planned to reach the destination, if possible using the existing energy resources, and/or to efficiently plan an intermediate stop (filling station) on the basis of the known information.

The present invention provides an example method for controlling a hybrid drive of a vehicle, the hybrid drive having an electric drive and a fuel drive, and the example method including the following steps: providing a database which has the assignments between route information and first and second route criteria, the route information representing routes which may be traveled by the vehicle, and the first route criterion representing a preferred use of the electric drive on the particular assigned route and the second route criterion representing a preferred use of the fuel drive on the particular assigned route; receiving a current piece of route information via an interface, the current route information representing a route traveled or to be traveled by the vehicle; determining a current route criterion assigned to the current route information based on the database; and providing a piece of control information for using the electric drive if the current route criterion is the first route criterion or for using the fuel drive if the current route criterion is the second route criterion.

The example method according to the present invention may be carried out, for example, by a navigation system of the vehicle. The database may represent a map material for the navigation system or be linked to a corresponding map material. Each route may represent a direction-specific section of a road which may be traveled by the vehicle. The first or the second route criterion may be assigned to each piece of route information included in the database. The route criteria thus represent attributes which are assigned to the individual route sections in order to classify them with regard to an efficient use of the hybrid drive. A corresponding route criterion may be assigned to all or only selected pieces of route information in the database. If the first route criterion is assigned to a piece of route information, the corresponding route is classified in such a way that it is more efficient to travel the route using the electric drive instead of the fuel drive. If the second route criterion is assigned to a piece of route information, the corresponding route is classified in such a way that it is more efficient to travel the route using the fuel drive instead of the electric drive. The database may be stored in a memory device even before the method according to the present invention is carried out, so that existing and prepared data may be accessed while the method according to the present invention is being carried out. This means that a classification of the routes with regard to the use of the hybrid drive, a choice of either the first or the second route criterion and the assignment of the corresponding route criterion to the corresponding route may be performed before the method according to the present invention is carried out. The current route information may be provided by a navigation system and include a piece of information about a current location and a current direction of travel of the vehicle. With the aid of a suitable map material, the road or route currently being traveled by the vehicle may be determined from the location and the direction of travel. The assigned route criterion for this route may be ascertained on the basis of the database. For this purpose, the route criterion assigned to the route need only be read out. No further assessment of the route criterion or other route characteristics is necessary. The control information may be suitable to activate the hybrid drive directly for the purpose of switching from the electric drive to the fuel drive or vice versa. Alternatively, the control information may also be used as one of multiple bases for decision-making, based on which a hybrid drive is controlled.

The example method according to the present invention may include a step for receiving a piece of updating information via an updating interface. The updating information may have an updated route criterion at least for one piece of route information in the database, the updated route criterion being either the first or the second route criterion. In a step for updating, the database may be updated on the basis of the updating information. A route may thus be dynamically reclassified, for example from an electric drive to a fuel drive. The updating interface may be coupled with a receiving device of the vehicle or of a control unit for carrying out the method according to the present invention, so that the updating information may be transmitted wirelessly from a transmitting system outside the vehicle.

The updating information may thus represent a piece of information which is provided by a central updating device or another vehicle to a plurality of vehicles. The central updating device may be designed as a server. Route-specific data may be collected and evaluated in the central updating device to check whether a change in a route criterion is necessary or reasonable. A route which has not yet been assigned a route criterion may be assigned a corresponding route criterion. Corresponding modified or new route criteria may be transmitted via the updating information to update the databases used with the aid of the modified or new route criteria.

According to an example embodiment of the present invention, the database may represent a digital map of a navigation system. The routes which may be traveled are already provided in a map of this type, so that only links to the route criteria are necessary. In addition to the route criteria according to the present invention, additional route options which, for example, concern the length of the routes or the possible driving speed on the routes may also be assigned to the individual routes.

The example method according to the present invention may include a step for evaluating a current motion profile of the vehicle to determine a new route criterion for a current route being traveled by the vehicle. The new route criterion may match the first route criterion if the current route being traveled is classified on the basis of the motion profile in such a way that it is suitable for using the electric drive. Alternatively, the new route criterion may match the second route criterion if the current route being traveled is classified on the basis of the motion profile in such a way that it is suitable for using the fuel drive. The new route criterion may be used as the basis for dynamic updating of the existing route criteria. In particular, the existing route criterion assigned to the current route being traveled may be replaced by the new route criterion. The new route criterion may be used to update the vehicle's own database. The new route criterion may also be used to update the database of subsequent vehicles.

For example, a number of start and stop operations, acceleration and braking operations and/or an average fuel consumption of the vehicle on the current route may be evaluated to determine the new route criterion.

In a step for providing, the new route criterion may be provided to a transmitting interface so that the new route criterion may be received by the central updating device as the basis for the updating information and/or by other vehicles as the updating information. It is thus possible to continuously optimize the route criteria.

The present invention furthermore provides a database for a navigation system of a vehicle, including the following features: a plurality of pieces of route information which represent the routes which may be traveled by the vehicle; and first and second route criteria which are assigned to at least some of the plurality of the pieces of route information, the first route criterion representing a preferred use of the electric drive on the particular assigned route, and the second route criterion representing a preferred use of the fuel drive on the particular assigned route. A database of this type provides an advantageous enhancement for navigation systems which are used in hybrid vehicles.

The present invention furthermore provides an example method for calculating a route with the aid of a navigation system, the method including the following steps: providing a database according to the present invention for a navigation system; receiving a piece of information on the starting point and destination of a route via an interface; ascertaining a course of the route between the starting point and destination using the database; and providing the course of the route. A route course which is optimally adapted to the hybrid drive may thus be determined with the aid of the database. Additional options, for example minimum emissions or maximum range, may also be included in the route calculation. The route criteria according to the present invention may thus be used accordingly for known route options, such as the shortest driving distance or driving time.

The present invention furthermore provides an example control unit which is designed to carry out or implement the steps of the methods according to the present invention. An object of the present invention may also be achieved quickly and efficiently with the aid of this embodiment variant of the present invention in the form of a control unit.

In the present case, a control unit may be understood to mean an electrical device which processes sensor signals and outputs control signals as a function thereof. The control unit may have an interface which may be designed as hardware and/or software. In a hardware design, the interfaces may be, for example, part of a so-called system ASIC, which includes various functions of the control unit. However, it is also possible for the interfaces to be separate, integrated circuits or to be made at least partially of discrete components. In a software design, the interfaces may be software modules which are provided, for example, on a microcontroller, along with other software modules.

A computer program product having program code, which is stored on a machine-readable carrier such as a semiconductor memory, a hard disk memory or an optical memory, and is used to carry out the method according to one of the specific embodiments described above when the program is executed on a control unit, is also advantageous.

The present invention furthermore provides a system for controlling hybrid drives of a plurality of vehicles, the hybrid drives having an electric drive and a fuel drive, including the following features: the plurality of vehicles, each of the vehicles having a control unit according to the present invention; and at least one central updating device which is designed to transmit pieces of updating information to the plurality of vehicles, the pieces of updating information having an updated route criterion at least for one piece of route information in the databases of the control units, the updated route criterion being either the first or the second route criterion.

BRIEF DESCRIPTION OF THE DRAWINGS

The present invention is explained in greater detail below by way of example on the basis of the figures.

DETAILED DESCRIPTION OF EXAMPLE EMBODIMENTS

Figure 1:
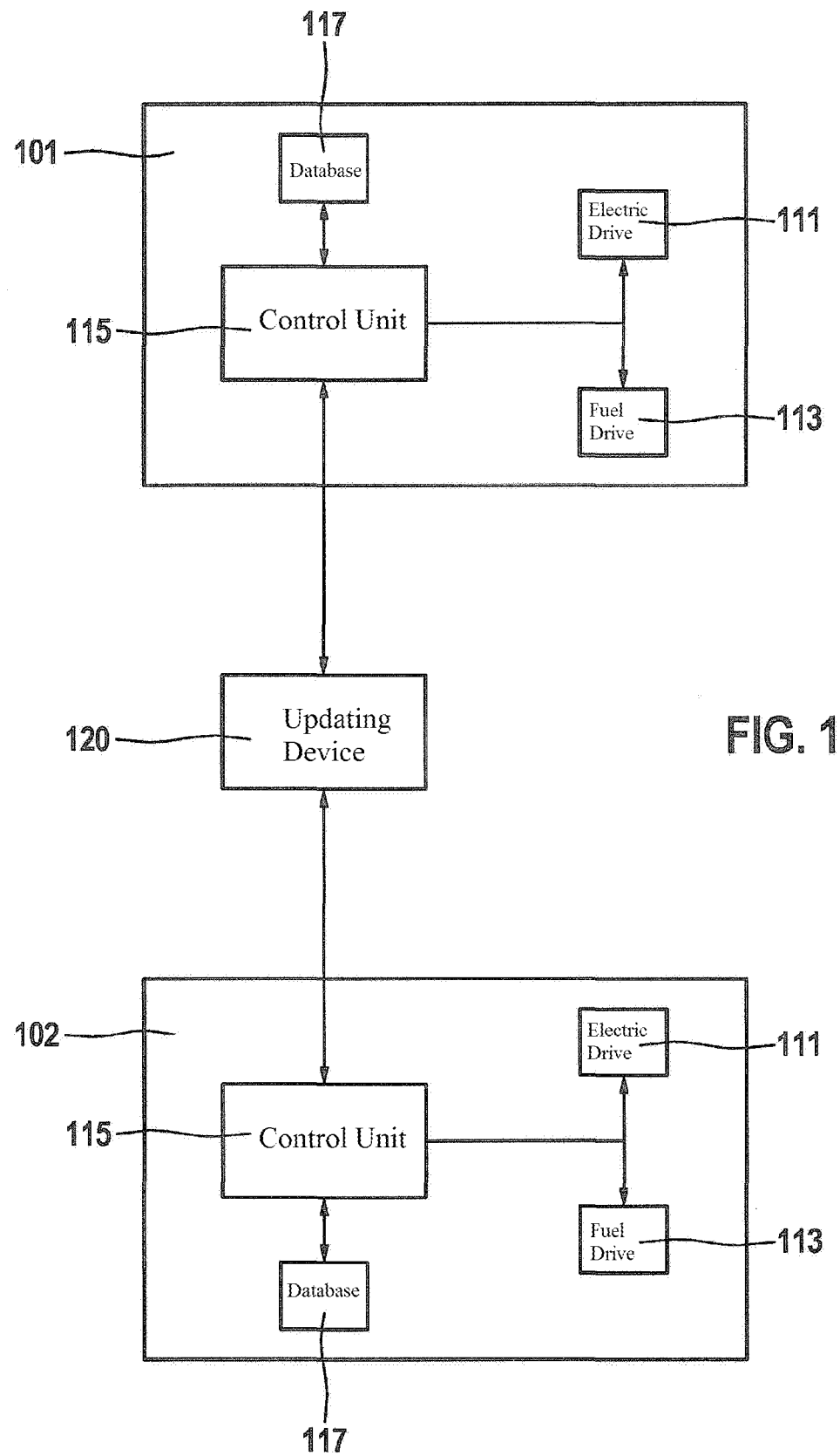
FIG. 1 shows a block diagram of a system for controlling hybrid drives of a plurality of vehicles, according to one exemplary embodiment of the present invention.

In the following description of preferred exemplary embodiments of the present invention, identical or similar reference numerals are used for the elements which are illustrated in the different figures and have similar elements, a repeated description of these elements being dispensed with.

FIG. 1 shows a block diagram of a system for controlling hybrid drives of a plurality of vehicles, according to one exemplary embodiment of the present invention. Two vehicles 101, 102, each of which has a hybrid drive, are shown. The hybrid drives each have an electric drive 111 and a fuel drive 113, for example an internal combustion engine. Furthermore, vehicles 101, 102 each have a control unit 115 and a database 117. Control unit 115 may be designed to read out data from database 117. For example, database 117 may be implemented as a lookup table, route sections being entered in one column and route criteria being entered in another column, so that one route criterion is assigned to each route section. The route assigned route section to drive vehicle 101, 102 with the aid of electric drive 111 or with the aid of fuel drive 113. For example, the route criterion may have a first value if a route section is classified as suitable for electric drive 111, and it may have a second value if a route section is classified as suitable for fuel drive 113. Control unit 115 may provide control data to electric drive 111 and fuel drive 113 or to an interconnected control device via an interface. Control unit 115 may be designed to determine the control data on the basis of database 117 and pieces of information about a route section which has just been traveled or is to be traveled. The system may have an updating device 120 which is designed to transmit data for updating databases 117 to vehicles 101, 102 and their control units 115 or to databases 117. Control unit 115 may furthermore be designed to transmit data to updating device 120. Control unit 115 may have additional interfaces, for example to a GPS receiver, to obtain information about location and direction of travel. The system may include additional vehicles and additional updating devices. Control unit 115 may be part of a navigation unit. Database 117 may be integrated into control unit 115 or be coupled via an interface.

Figure 2:
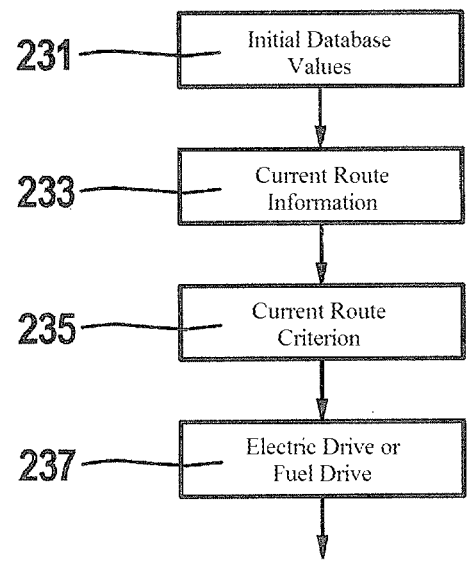
FIG. 2 shows a flow chart of a method for controlling a hybrid drive of a vehicle, according to one exemplary embodiment of the present invention.

FIG. 2 shows a flow chart of an example method for controlling a hybrid drive of a vehicle, according to one exemplary embodiment of the present invention. The vehicle may be one of the vehicles illustrated in FIG. 1 which has a hybrid drive and a control unit having a corresponding database. The database may be provided in advance with initial values in a step 231. For example, a current piece of route information may be received during travel in a step 233. The route information may be provided, for example, by a navigation system and display a route traveled or to be traveled by the vehicle. A current route criterion corresponding to the current route information may be read out from the database in a step 235. Based on the current route criterion, it may be determined in a step 237 whether the current route is to be traveled with the aid of the electric drive or with the aid of the fuel drive. A corresponding piece of control information may be provided to the hybrid drive. Either the electric drive or the fuel drive may be activated in response to the control information.

After the database has been originally provided, the contents of the database may be updated continuously. For this purpose, corresponding pieces of updating information may be received, for example by the updating device shown in FIG. 1. The updating information may be based on data which is provided by vehicles. For this purpose, control units of the vehicles may continuously evaluate current motion profiles of the vehicles to ascertain therefrom which drive is the most suitable for a route section being traveled. Corresponding information may be transmitted to the updating device, for example over a radio link.

The approach according to an example embodiment of the present invention of efficient control of the hybrid drive with the aid of navigation is based on the fact that the different operating modes of a hybrid drive are particularly efficient in various driving situations. The electric motor is particularly suitable for situations involving many start and stop operations and frequent acceleration and braking operations, which occur, for example, in urban traffic. The fuel drive is particularly suitable for routes having high speeds, which is the case, for example, on the highway.

A new route criterion, which takes into account both the number of start and stop operations, the acceleration and braking operations as well as the average fuel consumption, is defined according to the present invention. This criterion may be ascertained for a specific route section on the basis of average values as well as dynamically. The route criterion and its initial value may be stored directly in the map data of the navigation system.

An average value for a specific route section may be detected by recording comparison values, e.g., via a test fleet, or by ascertainment via "dynamic detection."

If ascertainment via the test fleet is used, the detected values are stored locally in the vehicles, e.g., in the head unit, and are read out from the vehicles at the end of the detection trip. Route criteria may be ascertained from the read-out data and assigned to the route sections.

In "dynamic detection," vehicles which travel a route section transmit the aforementioned data via a communication device, which may be based, for example, on GSM or WLAN, to a server and to a database which evaluates the ascertained data and transmits it to other vehicles via another communication device. The transmission may take place, for example, via GSM or radio. This detection may be used to provide the route criterion dynamically, depending on the traffic situation on the section traveled.

For example, if a traffic jam forms on a highway, the route section concerned is switched from "fuel" mode to "electric" mode. The switchover may be carried out according to a change in the route criterion for the route section concerned.

Figure 3:
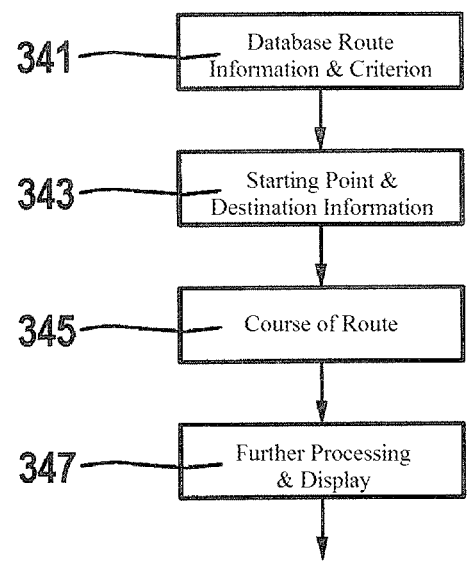
FIG. 3 shows a flow chart of a method for calculating a route with the aid of a navigation system, according to one exemplary embodiment of the present invention.

FIG. 3 shows a flow chart of a method for calculating a route with the aid of a navigation system, according to one exemplary embodiment of the present invention. In a step 341, a database may first be provided which includes not only the route or distance information needed for calculating the route but also route criteria which indicate the route sections for which the electric drive of the hybrid drive is suitable and the route sections for which the fuel drive of the hybrid drive is suitable. A piece of starting point information and a piece of destination information may be received in a step 343. The starting point information and the destination information may be entered by a user of the navigation system. Based on the starting, point information and the destination information as well as the database, a course of a route between the starting point and the destination may be determined in a step 345. The course may be provided for further processing in a step 347 and displayed, for example, to the user. Additional map material, additional route options and also status data of the hybrid drive may be used to determine the course. By taking the route criteria into account, the route calculation may be tailored to the special nature of the hybrid drive.

The route may be calculated before the beginning of a trip. The route criterion may be taken into account in such a way that the existing energy reserves in the fuel tank as well as the state of charge of the battery may be taken into account in such a way that the most efficient use possible of the energy sources is enabled as well as that the destination is preferably reached without an intermediate stop. However, if an intermediate stop must be made, this stop is planned in the route calculation on the basis of existing filling stations or energy charging stations and suggested to the driver via the human-machine interface (HMI).

The exemplary embodiments illustrated in the figures and described here were selected only by way of example. Different exemplary embodiments may be combined with each other in their entirety or with regard to individual features. In addition, one exemplary embodiment may be supplemented by features of another exemplary embodiment. Furthermore, method steps according to the present invention may be repeated as well as carried out in a different order than the one described. If an exemplary embodiment has an "and/or" conjunction between a first feature and a second feature, this may be read in such a way that the exemplary embodiment has both the first feature and the second feature according to one specific embodiment and either only the first feature or only the second feature according to another specific embodiment.

What is claimed is:

1. A method for controlling a hybrid drive of a vehicle, the hybrid drive having an electric drive and a fuel drive, the vehicle having a control unit, and the method comprising:
   providing a database which has assignments between route information and first and second route criteria, the route information representing routes which may be traveled by the vehicle, the first route criterion representing a preferred use of the electric drive on the assigned route, and the second route criterion representing a preferred use of the fuel drive on the assigned route;
   receiving a current route information via an interface, the current route information representing a route which one of is being traveled or is to be traveled by the vehicle;
   determining by the control unit a current route criterion assigned to the current route information based on the database;
   providing a piece of control information by the control unit for using the electric drive if the current route criterion is the first route criterion, and for using the fuel drive if the current route criterion is the second route criterion;
   receiving updating information via an updating interface, the updating information having an updated route criterion at least for one piece of route information in the database, wherein the updated route criterion is either the first route criterion or the second route criterion; and
   updating the database based on the updating information.

2. The method as recited in claim 1, wherein the updating information represents a piece of information which is provided to one of a plurality of vehicles by a central updating device, or another vehicle.

3. The method as recited in claim 1, wherein the database represents a digital map of a navigation system.

4. The method as recited in claim 2, further comprising:
   evaluating a current motion profile of the vehicle to determine a new route criterion for a current route being traveled by the vehicle.

5. The method as recited in claim 4, wherein at least one of a number of start and stop operations, acceleration operations, braking operations, and an average fuel consumption of the vehicle on the current route are evaluated to determine the new route criterion.

6. The method as recited in claim 4, further comprising:
   providing the new route criterion to a transmitting interface so that the new route criterion may be received at least one of by the central updating device as the basis for the updating information, and by other vehicles as the updating information.

7. A control unit to control a hybrid drive of a vehicle, the hybrid drive having an electric drive and a fuel drive, the control unit configured to provide a database which has assignments between route information and first and second route criteria, the route information representing routes which may be traveled by the vehicle, the first route criterion representing a preferred use of the electric drive on the assigned route, and the second route criterion representing a preferred use of the fuel drive on the assigned route; to receive a current route information via an interface, the current route information representing a route which one of is being traveled or is to be traveled by the vehicle; to determine a current route criterion assigned to the current route information based on the database; and to provide a piece of control information for using the electric drive if the current route criterion is the first route criterion, and for using the fuel drive if the current route criterion is the second route criterion; and to receive updating information via an updating interface, the updating information having an updated route criterion at least for one piece of route information in the database, wherein the updated route criterion is either the first route criterion or the second route criterion.

8. A machine-readable medium storing a computer program including program code, the program code to control a hybrid drive of a vehicle, the hybrid drive having an electric drive and a fuel drive, the program code, when executed by a control unit, causing the control unit to perform the steps of:
   providing a database which has assignments between route information and first and second route criteria, the route information representing routes which may be traveled by the vehicle, the first route criterion representing a preferred use of the electric drive on the assigned route, and the second route criterion representing a preferred use of the fuel drive on the assigned route;
   receiving a current route information via an interface, the current route information representing a route which one of is being traveled or is to be traveled by the vehicle;
   determining a current route criterion assigned to the current route information based on the database;
   providing a piece of control information for using the electric drive if the current route criterion is the first route criterion, and for using the fuel drive if the current route criterion is the second route criterion; and
   receiving updating information via an updating interface, the updating information having an updated route criterion at least for one piece of route information in the database, wherein the updated route criterion is either the first route criterion or the second route criterion.

9. A database coupled to a control unit for a navigation system of a vehicle, comprising:
   a plurality of pieces of route information which represent routes which may be traveled by the vehicle;
   first and second route criteria which are assigned at least to some of the plurality of pieces of route information, the first route criterion representing a preferred use of the electric drive on the assigned route, and the second route criterion representing a preferred use of the fuel drive on the assigned route; and
   an updating interface for receiving updating information, the updating information having an updated route criterion at least for one piece of route information in the database, wherein the updated route criterion is either the first route criterion or the second route criterion.

10. A method for calculating a route with the aid of a navigation system connected to a control unit, comprising:
   providing a database for a navigation system, the database including a plurality of pieces of route information which represent routes which may be traveled by the vehicle, and first and second route criteria which are assigned at least to some of the plurality of pieces of route information, the first route criterion representing a preferred use of the electric drive on the assigned route, and the second route criterion representing a preferred use of the fuel drive on the assigned route;
receiving a piece of information about a starting point and destination of a route via an interface;
ascertaining a course of the route between the starting point and the destination using the database;
providing the course of the route; and
receiving updating information via an updating interface, the updating information having an updated route criterion at least for one piece of route information in the database, wherein the updated route criterion is either the first route criterion or the second route criterion.

11. A system for controlling hybrid drives of a plurality of vehicles, the hybrid drives having an electric drive and a fuel drive, comprising:
a plurality of vehicles, each of the vehicles having a control unit to control a hybrid drive of a vehicle, the hybrid drive having an electric drive and a fuel drive, the control unit configured to provide a database which has assignments between route information and first and second route criteria, the route information representing routes which may be traveled by the vehicle, the first route criterion representing a preferred use of the electric drive on the assigned route, and the second route criterion representing a preferred use of the fuel drive on the assigned route; to receive updating information via an updating interface, the updating information having an updated route criterion at least for one piece of route information in the database, wherein the updated route criterion is either the first route criterion or the second route criterion; to receive a current route information via an interface, the current route information representing a route which one of is being traveled or is to be traveled by the vehicle; to determine a current route criterion assigned to the current route information based on the database; and to provide a piece of control information for using the electric drive if the current route criterion is the first route criterion, and for using the fuel drive if the current route criterion is the second route criterion; and
at least one central updating device which is designed to transmit the updating information to the plurality of vehicles.

* * * * *